(12) United States Patent
Peng et al.

(10) Patent No.: US 8,415,009 B2
(45) Date of Patent: Apr. 9, 2013

(54) ENGINEERED COMPOSITE BUILDING MATERIALS AND METHODS OF MAKING SAME

(75) Inventors: Weiling Peng, Etiwanda, CA (US);
Hong Chen, Alta Loma, CA (US);
Caidian Luo, Alta Loma, CA (US);
Donald J. Merkley, Alta Loma, CA (US)

(73) Assignee: James Hardie Technology Limited, Dublin (IE)

( * ) Notice: Subject to any disclaimer, the term of this patent is extended or adjusted under 35 U.S.C. 154(b) by 1371 days.

(21) Appl. No.: 11/638,624

(22) Filed: Dec. 13, 2006

(65) Prior Publication Data
US 2008/0141908 A1 Jun. 19, 2008

(51) Int. Cl.
*B32B 3/00* (2006.01)
*B32B 5/16* (2006.01)

(52) U.S. Cl. ..................... 428/331; 428/312.4

(58) Field of Classification Search ............... 52/782.1, 52/783.1, 309.12, 309.17; 428/312.4, 334
See application file for complete search history.

(56) References Cited

U.S. PATENT DOCUMENTS

| | | | |
|---|---|---|---|
| 4,269,869 A | 5/1981 | Morohashi et al. | |
| 4,716,051 A | 12/1987 | Rodder | |
| 4,810,536 A | 3/1989 | Jansen et al. | |
| 5,091,002 A | 2/1992 | Schamberg et al. | |
| 5,236,994 A | 8/1993 | Markusch et al. | |
| 5,242,708 A * | 9/1993 | Fekete et al. | 427/136 |
| 5,314,533 A | 5/1994 | Goebel et al. | |
| 5,912,086 A | 6/1999 | Ando et al. | |
| 6,007,619 A | 12/1999 | Laas et al. | |
| 2002/0090316 A1 | 7/2002 | Standke et al. | |
| 2003/0089061 A1 | 5/2003 | DeFord et al. | |
| 2003/0186035 A1 | 10/2003 | Cruce et al. | |
| 2004/0068028 A1 | 4/2004 | Baumgart et al. | |
| 2005/0233149 A1 | 10/2005 | Ansell | |
| 2009/0054588 A1 | 2/2009 | Maier et al. | |

* cited by examiner

*Primary Examiner* — Joshua J Michener
*Assistant Examiner* — Elizabeth A Plummer
(74) *Attorney, Agent, or Firm* — Knobbe Martens Olson & Bear, LLP (57) ABSTRACT

An engineered composite building material, such as fiber cement, having one or more engineered sub-surface regions designed to provide the building material with improved moisture ingress resistance, paint adhesion, and other mechanical properties is provided. The sub-surface region has a cement-polymer matrix formed by introducing an impregnating agent into the pores of the substrate. The composite building material may be formed by applying impregnating agents to the subsurface regions of the substrate to form chemical and/or mechanical bonds with the matrix of the building material, the reinforcement fibers, and/or the surface coatings applied to the material. The thickness of the sub-surface regions may be controlled by varying the viscosity and porosity of the building material substrate. The cement-polymer building material has enhanced durability, weather resistance, strength, and stiffness.

15 Claims, 2 Drawing Sheets

ENGINEERED COMPOSITE BUILDING MATERIALS AND METHODS OF MAKING SAME

BACKGROUND OF THE INVENTION

This invention generally relates to composite building materials, and in particular, to a composite building material having an engineered cement-polymer matrix.

Any discussion of the prior art throughout the specification should in no way be considered as an admission that such prior art is widely known or forms part of common general knowledge in the field.

Fiber-reinforced composite materials, particularly fiber cement, have become popular for use as a building material. In many instances, fiber cement is preferred over the more conventional materials such as wood, metal, or plastics. When compared to wood, fiber cement has better water resistance and is also less prone to rotting, cracking or splitting. Additionally, unlike metal or vinyl cladding, which is typically sold in fixed colors, fiber cement articles may be painted on-site using any color of a standard acrylic-based exterior paint typically applied on wood.

To extend the service life of paint on fiber cement, it is generally desirable to reduce the moisture absorbed by the fiber cement so as to reduce a negative effect of absorbed moisture on the integrity of the coating. While most paints may appear capable of resisting water ingress, they are still water permeable to a certain extent and their integrity and adhesion to a substrate may be negatively affected by the amount of moisture absorbed by the substrate. In addition, paint is usually not applied to each and every surface of a building article and this may allow moisture to enter the article through uncoated surfaces. Thus, it is highly desirable to apply a sealer or hydrophobic treatment to all exterior sides or surfaces of a building material, particularly to extend the durability of any coating on the building material, such as a fiber reinforced composite material.

While sealers for concrete applications are well known in the art, conventional concrete sealers do not work well with cementitious, gypsum, or other inorganic composite materials containing cellulose, glass, steel or polymeric fibers. Additionally, these conventional sealers typically have high viscosity and tend to form a film on the surface of the composite material. As such, they are intended to be used as a surface treatment only and are not formulated to penetrate into the subsurface layers of the composite material, to effectively fill the subsurface pores and block the pores therein from moisture. Consequently, paint adhesion and long term paint durability on fiber cement is less than optimal.

SUMMARY OF THE INVENTION

In view of the foregoing, there is a need for an engineered building material, particularly cementitious, gypsum, or other inorganic composite material, that resists water ingress and increases the service life of a paint and/or topcoat on its exterior surfaces. To this end, there is a particular need for an engineered fiber cement building material that is more weather resistant and is capable of maintaining durable adhesion between the substrate of the material and exterior paint or coatings.

As used herein, the terms "impregnate," "impregnating" and "impregnation" shall mean to cause an additive compound to be imbued, permeated or saturated in one or more subsurface regions of a building material including the core matrix of the building material.

Preferred embodiments of the invention may include an engineered composite building material that comprises a cementitious substrate having a pre-determined porosity and a sub-surface region formed in the substrate. The sub-surface region comprises a cement-polymer matrix configured to reduce moisture absorption of the building material. The cement-polymer matrix may comprise a polymeric impregnating agent chemically bonded to hydroxyl functional groups in the substrate. Thickness of the sub-surface region may be determined by viscosity of the impregnating agent and the porosity of the cementitious substrate. In one embodiment, the thickness of the impregnated subsurface region is about 10 microns, preferably 50 microns, preferably 100 microns or greater. In another embodiment, the thickness of the impregnated subsurface region is about 100 microns and more preferably 150, 200, 250, 300 microns or greater. In yet another embodiment, the thickness of the impregnated sub-surface region is substantially the same as a thickness of the fiber cement matrix.

In one or more preferred implementations, the impregnating agent is selected from the group consisting of one or more isocyanates, epoxies, acrylics, organics with unsaturated double bonds, and mixtures thereof. In certain embodiments, the impregnating agent comprises an isocyanate compound with one or more blocked functional groups. Impregnating agents may also be selected from the group consisting of silanes and low viscosity oligomers or monomers and combinations thereof. In one embodiment, the impregnating agent is a low viscosity material which, in an uncured state, has a viscosity of less than about 300 centipoise (cps) at 25° C. In certain implementations, the impregnating agent further comprises a polymerization initiator selected from the group consisting of organic peroxides, azo compounds, and mixtures thereof. Impregnating agents may also include a catalyst selected from the group consisting of tertiary amines, metal salts, and combinations thereof. Preferably, the impregnating agent (or agents) selected forms non-hydrolysable bonds with free hydroxyl and other functional groups dispersed in the fiber cement matrix. In one embodiment, the fiber cement matrix comprises cellulose fibers and the impregnating agent forms non-hydrolysable bonds with free hydroxyl groups attached to the cellulose fibers. In other embodiments, the fiber cement matrix comprises polymer fibers selected from the group consisting of polyvinyl alcohol (PVA), modified polypropylene (PP), polyethylene (PE), and polyester fibers. In one embodiment, the impregnating agent comprises an autogenously curable compound.

In certain embodiments, the composite building material further includes an exterior coating formed on an exterior surface of the building material. The exterior coating is may be selected from the group consisting of paints, topcoats, primers, sealers, and combinations thereof. In one embodiment, the impregnating agent forms chemical bonds with the exterior coating to improve the bond strength between the coating and the fiber cement matrix. In another embodiment, the impregnated subsurface region increases the modulus of elasticity of the building material by about 5% or more. In some implementations, the impregnated subsurface region reduces the water absorption of the building material by more than about 10% of the water absorption value of the same material without treatment and increases the freeze thaw cycles by more than about 15% of the same material without treatment based on the retention of required material properties such as, for example, Modulus of rupture (MOR), modulus of elasticity (MOE), and Z direction tensile strength. The building material may be selected from the group consisting of gypsum boards, fiber cement boards, fiber cement boards reinforced by a mesh or continuous fibers, gypsum boards reinforced by short fibers, a mesh or continuous fibers, inorganic bonded wood and fiber composite materials, geopolymer bonded wood and fiber boards, concrete roofing tile material, and fiber-plastic composite materials.

Other embodiments of the invention may provide a method of forming an engineered composite building article. One or more methods comprise forming a cementitious substrate and incorporating a curable impregnating agent into a subsurface region of the substrate in a manner such that the impregnating agent is allowed to penetrate into the sub-surface region of the substrate to a predetermined depth. The method may further include curing the impregnating agent after the impregnating agent has penetrated into the substrate to the predetermined depth. Preferably, the curable impregnating agent has a viscosity of less than or equal to about 500 cps at 25° C. In one embodiment, the impregnating agent may be autogenously cured. In some embodiments, the method further comprises reducing the viscosity of the curable impregnating agent prior to incorporating the agent in the subsurface region. In one embodiment, incorporating the curable impregnating agent in the subsurface region comprises applying the material to an exterior surface of the substrate after the substrate is cured and allowing the impregnating agent to penetrate into the cured substrate to a predetermined depth. In one embodiment, the pre-determined depth is at least about 10 microns. In another embodiment, the pre-determine depth is at least about 100 microns.

In one implementation, incorporating the curable impregnating agent in the cementitious substrate comprises combining the curable impregnating agent with ingredients for forming the cementitious substrate and forming a shaped green article, wherein the curable impregnating agent is distributed throughout at least a portion of the shaped green article. In other implementations, incorporating the curable impregnating agent in the cementitious substrate comprises combining ingredients for forming the cementitious substrate to form a shaped green article and then applying the curable impregnating agent to an exterior surface of the shaped green article. The curable impregnating agent preferably has a viscosity of about 500 cps or less at 25° C., more preferably about 300 cps or less at 25° C. In certain embodiments, the method further comprises applying a protective coating to the building article. In some implementations, the method further comprises curing the curable impregnating agent under a process condition selected from the group consisting of ambient temperature, elevated temperature, cryogenic temperature, vacuum, pressure, atmospheric pressure, UV, infrared, electron beam, microwave or other radiations, and combinations thereof. The curable impregnating agent may be applied to the cementitious substrate by a process selected from group consisting of vacuum coater, dipping, flooding coater, direct roller coater, sprayers, fountain coater, brush coater, sea saw coater, and curtain coater, or any other coaters or reaction vessels, and combinations thereof. The cementitious substrate may be cured by a process selected from the group consisting of air curing, water curing (hot or ambient), microwave curing, autoclave curing, and combinations thereof.

In yet another implementation, embodiments may provide an engineered composite building material having a subsurface region comprising a cement-polymer matrix, wherein the cement-polymer matrix has a thickness of at least 10 microns and is configured to reduce moisture absorption of the building material by about 15% or more as compared to an equivalent composite building material without the sub-surface region.

In yet another implementation, embodiments may provide a composite building material having one or more impregnating agents therein. The impregnating agents are preferably capable of forming chemical and/or mechanical bonds with one or more components of the composite building material. These chemical and/or mechanical bonds are preferably freeze-thaw resistant and not hydrolysable, therefore, enhancing the durability of the material. In one embodiment, the impregnating agent is selected to form chemical and/or mechanical bonds with a cementitious matrix, with at least one type of reinforcing fiber, and/or with an exterior coating such as the sealer, primer, topcoat or paint.

According to one embodiment, the composite building material is a fiber reinforced inorganic composite material comprising an inorganic binder, reinforcing fibers, a reactive impregnating agent, one or more aggregates, and one or more fillers or additives. The inorganic binder may include but is not limited to Portland cement, high alumina cement, lime, ground granulated blast furnace slag cement, and high phosphate cement, or mixtures thereof. The aggregates may include but are not limited to ground silica sand, amorphous silica, micro silica, diatomaceous earth, coal combustion fly and bottom ashes, microspheres of glass, plastic beads and microspheres, ceramic, polymers, pre-reacted calcium silicate hydrate particles, calcium carbonate particles, rice hull ash, blast furnace slag, granulated slag, steel slag, mineral oxides, mineral hydroxides, clays, magnasite or dolomite, metal oxides and hydroxides, polymeric beads, or mixtures thereof. The reinforcing fibers may include but are not limited to various forms of cellulose fibers such as chemical, mechanical or thermal-mechanical pulps, ceramic fiber, glass fiber, mineral wool, steel fiber, and synthetic polymer fibers such as polyamides, polyester, polypropylene, polymethylpentene, polyacrylonitrile, polyacrylamide, viscose, nylon, PVC, PVA, rayon, glass ceramic, carbon, or any mixtures thereof. The fibers may also include engineered cellulose fibers such as those disclosed in International Publication Nos. WO 0228796 and WO 0228795, which are hereby incorporated by reference in their entirety for all purposes. The fillers may include but are not limited to low density organic and inorganic inert particles. The additives may include but are not limited to density modifiers, dispersing agents, silica fume, geothermal silica, fire retardants, thickeners, pigments, colorants, dispersants, foaming agents, flocculating agents, waterproofing agents, organic density modifiers, aluminum powder, kaolin, alumina trihydrate, mica, metakaolin, calcium carbonate, wollastonite, polymeric resin emulsions, and mixtures thereof.

In certain preferred embodiments, the impregnating agents include, but are not limited to, a low viscosity isocyanate, low viscosity of epoxy, low viscosity organics with unsaturated double bonds, silanes or their low viscosity oligomers, low viscosity acrylics, other low viscosity polymers, and their emulsions or dispersions. The impregnating agents may include one component or more of the above chemicals. They may also include the above chemicals in as a solid or with water, solvent and other diluents. Preferably, the viscosity of the impregnating agent is less than about 500 cps at 25° C., and less than about 200 cps at 25° C. and more preferably less than 250, 200, 175, 150, 125, 100, 75, 50, 25, 10, 1 or 0.1 cps at 25° C. Preferably, the impregnating agent may react with free hydroxyl (—OH) or other reactive groups dispersed throughout the matrix material, on the surface of the reinforcing fibers and/or other components, and/or on subsequently applied coatings.

Preferred embodiments of certain implementations may also include a method of forming a durable finished fiber cement material comprising an impregnating agent and a finishing coating. The finishing coating may be applied to the fiber cement material before or after curing of the impregnating agent. The finishing coating on the uncured impregnated fiber cement substantially eliminates or minimizes evaporation of the impregnating agent during its curing, which may provide the advantage of reducing VOC in production and improving the retention of the impregnating agent. In one embodiment, the impregnating agents such as silane and isocyanate may react with —OH group in the fiber cement and with moisture in the substrate and in the air, and thus may be cured under ambient conditions.

Certain embodiments and implementations as described herein may provide a formulation for forming a building article. The formulation may comprise ingredients for forming a fiber reinforced cementitious substrate and an impregnating agent comprising a curable polymeric compound having a viscosity of less than about 500 cps at 25° C. Preferably, the impregnating agent is selected to form non-hydrolysable chemical bonds with one or more ingredients for forming the fiber reinforced cementitious substrate. In one embodiment, the ingredients for forming the fiber reinforced cementitious substrate comprises fibers selected from the group consisting of cellulose fibers, PVA fibers, PP fibers, PE fibers, polyester fibers, carbon fibers, steel fibers, and combinations thereof.

Certain embodiments may advantageously provide finished fiber cement building materials with the desirable characteristics of reduced water absorption, reduced rate of water absorption, lower water migration, and lower water permeability. Certain embodiments may also impart the final products with enhanced paint adhesion, freeze-thaw resistance, chemical resistance, salt resistance, and better mechanical properties as compared to conventional fiber cement products.

BRIEF DESCRIPTION OF THE DRAWINGS

For more complete understanding of the features and advantages of the inventions described herein, reference is now made to a description of the invention along with accompanying figures, wherein.

DETAILED DESCRIPTION OF PREFERRED EMBODIMENTS

Although making and using various embodiments are discussed in detail below, it should be appreciated that the description provides many inventive concepts that may be embodied in a wide variety of contexts. The specific aspects and embodiments discussed herein are merely illustrative of ways to make and use the invention, and do not limit the scope of the invention.

References will now be made to the drawings wherein like numerals refer to like or similar parts throughout. The drawing figures are not necessarily to scale and certain features may be shown exaggerated in scale or in somewhat generalized or schematic form in the interest of clarity and conciseness.

Figure 1:
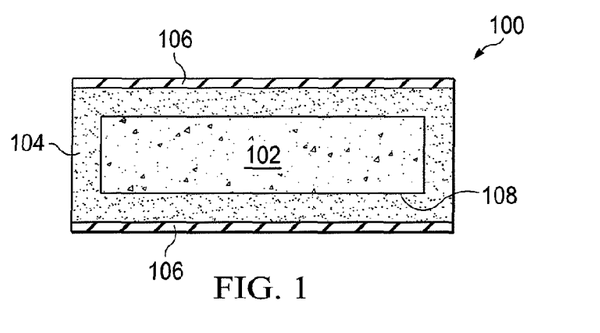
FIG. 1 is a cross sectional schematic view of a composite building article of one preferred embodiment showing a sub-surface region containing one or more impregnating agent that is able to form chemical and/or mechanical bonds with one or more components of the building material.

FIG. 1 schematically illustrates a cross sectional view of an engineered composite building material 100 of at least one preferred embodiment. As shown in FIG. 1, the building material 100 comprises a substrate 102 having one or more engineered sub-surface regions 104 and a coating 106 formed on an exterior surface 108 of the substrate 102. Preferably, the engineered sub-surface regions 104 comprise a cement-polymer composite matrix designed to provide the building material with improved physical and mechanical properties.

The substrate 102 of the engineered composite building material 100 in FIG. 1 is porous and may be based on a variety of different materials such as gypsum composite, cement composite, geopolymer composite, or other composites having an inorganic binder. The substrate 102 may be sanded, machined, extruded, molded or otherwise formed into any desired shape by various processes known in the art. The substrate 102 may be fully cured, partially cured or in the uncured "green" state. A variety of different fiber cement compositions and methods of making fiber cement substrates may be used for these applications, such as those described in Australian Patent No. AU515151, International Publication No. WO 0169547, and International Publication No. WO 9845222, which are hereby incorporated by reference in their entirety for all purposes.

The engineered sub-surface regions 104 in the substrate 102 illustrated in FIG. 1 preferably comprise a matrix formed of a cementitious material and a polymer. In one embodiment, the cement-polymer matrix comprises an intimate blend of fiber cement and one or more impregnating agents that are capable of forming chemical and/or mechanical bonds with the binder, the filler, the aggregate, reinforcement fibers, and/or any other components of a fiber cement composite matrix. The one or more impregnating agents may also be capable of forming chemical and/or mechanical bonds with the exterior coating 106 of the material, thereby improving the adhesion between the coating 106 and the substrate 102. Some embodiments may have chemical bonding only, mechanical bonding only, or a combination of chemical and mechanical bonding. The impregnating agents preferably penetrate the voids and interstices of the porous fiber cement substrate 102 and form chemical and/or mechanical bonds with the fiber cement without requiring the aid of radiation or thermal curing. In some implementations, the impregnating agents are chemically bonded to the hydroxyl (—OH) or other reactive groups present in the cement or on the fibers in the substrate. The impregnating agents may be autogenously cured, and/or cured with the help of curing aids, heat or radiation. As described in greater detail below, the impregnating agents may include but are not limited to low viscosity isocyanates, low viscosity epoxies, low viscosity organics with unsaturated double bonds, silanes or their low viscosity oligomers, low viscosity acrylics, other low viscosity polymers and their emulsions or dispersions.

The number, shape, distribution, and thickness of the sub-surface regions 104 may be engineered based on the intended final use of the composite material. Preferably, the thickness of each sub-surface region 104 is pre-selected and controlled by the porosity of the substrate, the amount of the impregnating agent introduced to the porous substrate, and the viscosity of the impregnating agent at room temperature. In one embodiment, the engineered sub-surface region extends substantially throughout the entire substrate and the thickness of the sub-surface region is substantially the same as the thickness of the substrate. In another embodiment, the thickness of the sub-surface region is between about 0.1% to about 100%, preferably between about 0.4%-100%, of the thickness of the substrate. In another embodiment, the thickness of the sub-surface region may be greater than or equal to about 10 microns, or may be greater than or equal to about 100 microns. In yet another embodiment, the sub-surface region may be between about 0.006 to about 5.0 inches (0.15-127 millimeters) thick.

The exterior coating 106 of the building material 100 shown in FIG. 1 may comprise a variety of different finishing and/or protective coatings such as paint, topcoat, primer, sealer, radiation curable coating, or thermally curable coating. In certain preferred embodiments, the cement-polymer composite matrix in the sub-surface region 104 of the substrate 102 forms chemical and/or mechanical bonds with the exterior coating to enhance the adhesion of the coating to the substrate 102. In certain implementations, the cement-polymer composite matrix is capable of forming chemical bonds with the —OH groups in the coating. The building material 100 illustrated in FIG. 1 may be used in a wide variety of building articles including but not limited to cladding panels, sheets, boards, planks, trims, shakes, decking, fascia, slates, fencing pickets or boards, and pipes.

In certain implementations, the composition of the impregnating agent used to form the sub-surface region 104 comprises an aromatic or aliphatic isocyanate compound that has a pH between about 6.5 and 7.5, and is preferred preferably between about 6.8 and 7.2. In one embodiment, the isocyanate compound present in the composition has an —NCO functional group that is approximately between 5% and 50% by weight of the total weight of the polymer, and may be between about 10% and 33% by weight. Furthermore, in another embodiment, the isocyanate polymer has a functionality (number of NCO per molecule) of preferably between about 2.0 and 3.5, with an average functionality of at least 2.0, and has a viscosity between 3 to 500 cps at 25° C. Suitable liquid isocyanate terminated compositions include but are not limited to Rubinate M and Rubinate 9433 available from Huntsman Polyurethanes of Sterling Heights, Mich.; Mondur MR, Mondur MRS, Mondur MRS-4, and Mondur MR200, available from Bayer Corporation, Pittsburgh, Pa.; Isonate 2134, Papi 94, Papi 27, Papi 20 available from Dow Chemical of Midland, Mich.; and mixtures thereof. Suitable aliphatic isocyanates include but are not limited to Desmodur XP-7100 (Bayer), Desmodur N-3400 (Bayer) and Desmodur N-3300 (Bayer); and mixtures thereof.

In some embodiments, the composition of the impregnating agent also comprises one or more catalysts known in the art such as tertiary amines, metal salts, and any combinations thereof. The metal salts may include, for example, tin carboxylate, organosilicon titanates, alkyl titanates, bismuth carboxylates, zinc carboxylates, zinc-based salt, tin-based salt catalyst and the like. Preferably, the system comprises approximately 0.005% to 5% of catalyst by weight. The catalyst is capable of catalyzing a reaction between the isocyanate and hydroxyl functional groups in the fiber cement in the presence of moisture so as to form chemical bonds between the isocyanate compounds in the mixture and the hydroxyl functional groups in the substrate. In one embodiment, the catalyst present in the system is a bismuth-based salt having a bismuth concentration between approximately 0.3% to 20% by weight. In another embodiment, the isocyanate compound further comprises a plasticizer that reduces the viscosity of the impregnating agent. A plasticizer such as, for example, alkyl phthalates (dioctylphthalate or dibutylphthalate), trictyl phosphate, epoxy plasticizers, toluene-sulfamide, chloroparaffins, adipics acid esters, castor oil, toluene and alkyl naphthalenes may be used for a polyurethane system. The amount of plasticizer used may be between about 0% and 90% by weight. In another embodiment, the isocyanate compound is emulsified with water before applications. In other embodiments, the isocyanate compounds have —NCO functional groups that are initially blocked and then activated after applications.

The impregnating agents may also include low viscosity monomers including single functional and poly-functional organics with unsaturated double bonds in one molecule. These components impregnate and bond well on fiber cement substrates. The mono-functional components may be, for example, styrene, methylstyrene, halogen styrenes, $C_1$-$C_4$ alkyl styrenes, vinyl butyl ether, vinyl toluene, vinyl acetate, vinyl esters of $C_3$-$C_{18}$ monocarboxylic acids, such as vinyl propionate, vinyl butyrate, vinyl valerate, vinyl hexanoate, vinyl 2-ethylhexanoate, vinyl decanoate, vinyl laurate, vinyl stearate, and vinyl esters of Versatic acids (Versatic acids are generally branched, aliphatic carboxylic acids having 5 to 11 carbon atoms), methyl (meth)acrylate, ethyl(meth)acrylate, propyl(meth)acrylate, butyl(meth)acrylate, 2-ethylhexyl (meth)acrylate, isooctyl(meth)acrylate, isodecyl(meth)acrylate, lauryl(meth)acrylate, stearyl(meth)acrylate, phenyl (meth)acrylate, cyclohexyl(meth)acrylate, dicyclopentanyl (meth)acrylate, isobornyl(meth)acrylate, methoxylated cyclodecatriene(meth)acrylate, 2-hydroxyethyl(meth)acrylate, 2-hydroxypropyl(meth)acrylate, 3-hydroxypropyl (meth)acrylate, 4-hydroxybutyl(meth)acrylate, polyethylene glycol mono(meth)acrylate, polypropylene glycol mono (meth)acrylate, alkyloxypolyethylene glycol mono(meth) acrylate, alkyoxypolyproylene glycol mono(meth)acrylate, phenoxypolypropylene glycol mono(meth)acrylate, phenoxypolypropylene glycol mono(meth)acrylate, tetrahydrofurfuryl(meth)acrylate, 2-hydroxy-3-phenoxypropyl(meth) acrylate, glycidyl(meth)acrylate, caprolactone-modified tetrahydrofurfuryl(meth)acrylate, 3-chloro-2-hydroxypropyl (meth)acrylate, N,N-dimethylaminoethyl(meth)acrylate, N,N-diethylaminoethyl(meth)acrylate, t-butylaminoethyl (meth)acrylate, morpholine(meth)acrylate, ethoxycarbonylmethyl(meth)acrylate, ethyleneoxide-modified phthalic acid (meth)acrylate, ethyleneoxide-modified succinic acid (meth) acrylate, trifluoroethyl(meth)acrylate, tetrafluoropropyl (meth)acrylate or 2-hydroxy-3-(meth) acryloyloxypropyltrimethylammonium chloride. The polyfunctional components preferably have at least two unsaturated double bonds in one molecule.

In certain preferred embodiments, a polymerization initiator is added to organics with unsaturated double bonds. For example, the following organic peroxides may be used as an initiator: (1) ketone peroxides, such as methyl ethyl ketone peroxide, cyclohexanone peroxide, 3,3,5-trimethylcyclohexanone peroxide, methylcyclohexanone peroxide, methylacetoacetate peroxide and acetylacetone peroxide; (2) peroxyketals, such as 1,1-bis(tert-butylperoxy)-3,3,5-trimethylcyclohexane, 1,1-bis(tert-butylperoxy) cyclohexane, 2,2-bis(tert-butylperoxy)octane, n-butyl-4,4-bis(tert-butylperoxy)valerate and 2,2-bis(tert-butylperoxy) butane; (3) hydroperoxides, such as tert-butyl hydroperoxide, cumene hydroperoxide, diisopropylbenzene hydroperoxide, paramethane hydroperoxide, 2,5-dimethylhexane-2,5-dihydroperoxide and 1,1,3,3-tetramethylbuthyl hydroperoxide;

(4) dialkyl peroxides, such as di-tert-butyl peroxide, tert-butylcumyl peroxide, dicumyl peroxide, alpha, alpha'-bis(tert-butylperoxy-meta-isopropyl)benzene, 2,5-dimethyl-2,5-di(tert-butylperoxy)hexane and 2,5-dimethyl-2,5-di(tert-butylperoxy)hexyne-3; (5) diacyl peroxides, such as acetyl peroxide, isobutyl peroxide, octanoyl peroxide, decanoyl peroxide, lauryonyl peroxide, 3,3,5-trimethylhexanoyl peroxide, succinic acid peroxide, benzoyl peroxide, 2,4-dichlorobenzoyl peroxide and m-toluoyl peroxide; (6) peroxydicarbonates, such as diisopropyl peroxydicarbonate, di-2-ethylhexyl peroxydicarbonate, di-n-propyl peroxydicarbonate, bis(4-tert-butylcyclohexyl) peroxydicarbonate, di-2-ethoxyethyl peroxydicarbonate, dimethoxyisopropyl peroxydicarbonate, di(3-methyl-3-methoxybutyl) peroxydicarbonate and diallyl peroxydicarbonate; (7) peroxy esters, such as tert-butyl peroxy acetate, tert-butyl peroxy isobutylate, tert-butyl peroxy pivalate, tert-butyl peroxy neodecanoate, cumyl peroxy neodecanoate, tert-butyl peroxy-2-ethylhexanoate, tert-butyl peroxy-3,3,5-trimethyl hexanoate, tert-butyl peroxy laurate, tert-butyl peroxy benzoate, di-tert-butyl peroxy isophthalate, 2,5-dimethyl-2,5-di(benzoyl peroxy)hexane, tert-butyl peroxymaleic acid, tert-butyl peroxy isopropyl carbonate, cumyl peroxy octoate, tert-hexyl peroxy neodecanoate, tert-hexyl peroxy pivalate, tert-butyl peroxy neohexanoate, tert-hexyl peroxy neohexanoate and cumyl peroxy neohexanoate; and (8) other organic peroxides: such as acetylcyclohexylsulfonyl peroxide and tert-butyl peroxyallyl carbonate.

Further, the following azo compounds may also be used as polymerization initiators: (9) azonitrile compounds, such as azobisisobutylonitrile, 2,2'-azobis(4-methoxy-2,4-dimethylvaleronitrile), 1,1'-azobis(cyclohexane-1-carbonitrile), 1-(1-cyano-1-methylethyl)azoformamide and 2-phenylazo-4-methoxy-2,4-dimethylvaleronitrile; (10) azoamidine compounds, such as 2,2'-azobis(2-methylpropionamidine) dihydrochloride; (11) cyclic azoamidine compounds, such as 2,2'-azobis-2-(2-imidazolin-2-yl)propane; (12) azoamide compounds, such as 2,2'-azobis(2-methyl-n-1,1-bis(hydroxymethyl)-2-hydroxyethyl propyonamide) and 2,2'-azobis(2-methyl-n-1,1 bis(hydroxymethyl)ethyl)propionamide; (13) Alkylazo compounds, such as 2,2'-azobis(2,4,4-trimethylpentane). The polymerization initiators may be used alone or in combination as a mixture of two or more. In certain embodiments, among the polymerization initiators, the organic peroxide is preferred from the view point of the curing property.

Another class of the impregnating agents is silane, including but not limited to: silanes, n-octyltriethoxysilane, n-octyltrimethoxysilane, alkoxylsilanes, alkylalkoxysilanes with 1 to 18 carbons in the alkyl chain, halide organosilanes, carboxylated organosilanes, epoxyalkoxylsilane, silicone emulsions, and mixtures thereof. In certain embodiments, the preferred impregnating agent for fiber cement comprises a combination of isocyanate, silane and components with double bonds. Another preferred impregnating agent comprises a combination of isocyanate with other low viscosity plasticizers such as ethers or esters or others. In certain implementations, the viscosity of the impregnating agents selected may be adjusted so that the impregnating agents may also be applied as an exterior coating such as protective sealer to the fiber cement article.

Figure 1A:
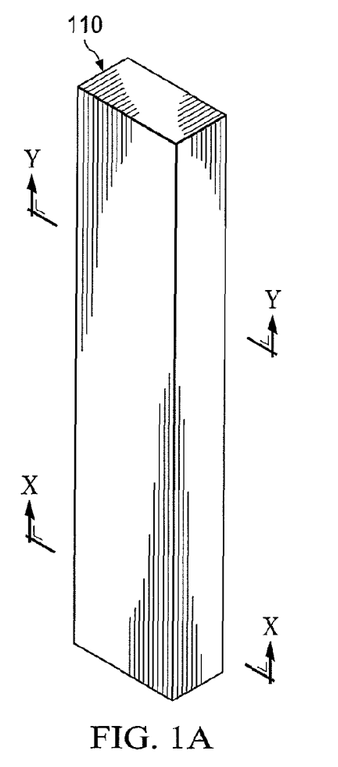
FIGS. 1A-1C illustrate one embodiment of the composite building article in the form of a building plank.

FIG. 1A illustrates an embodiment that includes a building plank 110, having a predetermined volume, length, width, and thickness. Building plank 110 is 4 to 16 feet (1.2-4.9 meters) in length, and preferably 6 to 12 feet (1.8-3.7 meters) in length; 2 inches to about 4 feet (0.05-1.2 meters) in width, preferably 3 inches to 12 inches (0.07-0.3 meters) in width and ⅛ inches to 6 inches (0.003-0.15 meters) in thickness, preferably ¼ inch to 1 inch (6-2.5 centimeters) in thickness. Building plank 110 may contain one or more voids within its volume. Building plank 110 may be used, for example, as an exterior cladding plank, cladding panel, roofing shingle, fencing plank, fencing panel or other covering for a building. Building plank 110 may also be cylindrical in shape and used as a pipe or column.

Figure 1B:
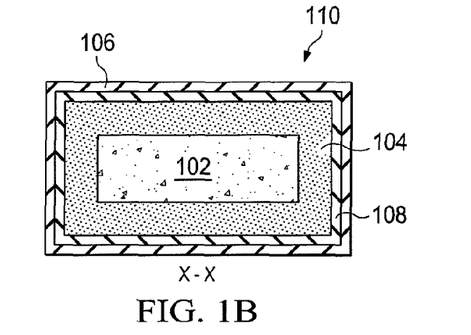

FIG. 1B depicts cross section X-X of building plank 110, comprising porous substrate 102, finishing coating 106, impregnated region 104 and a sealer material 108. Impregnated region 104 extends from at least one surface of building plank 100 to a predetermined depth into the porous substrate 102, preferably at least 0.002 inches (0.05 millimeters) and more preferably at least 0.005 inches (0.1 millimeters). Impregnated region 104 may be continuously coextensive along the entire length of building plank 110, or extend from one end of building plank 110 to a predetermined point along its length.

Figure 1C:
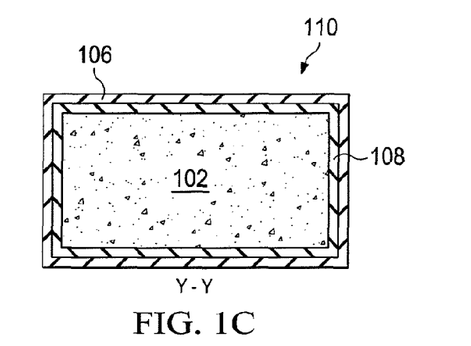

In one preferred embodiment, where the building plank is a fencing plank or panel, the impregnated region 104 extends between 0.1 inch and 12 inches (0.25-30.5 centimeters) from one end of building plank 110, more preferably between 4 and 8 inches (10-20 centimeters). The regions of building plank 110 that do not comprise an impregnated region 104 instead comprise, as shown in cross section Y-Y of FIG. 1C, porous substrate 102, finishing coating 106 and sealer 108. Sealer 108 may comprise any type of film-forming polymeric material, but is preferably an acrylic, acrylic copolymer, or isocyanate based sealer.

Figure 2:
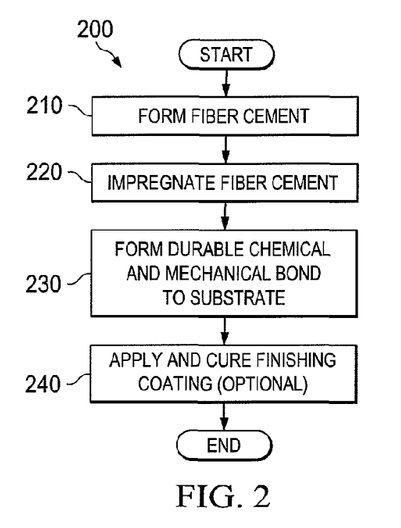
FIG. 2 illustrates a process for forming a composite building article according to one implementation as described herein.

FIG. 2 illustrates a process 200 for manufacturing an engineered composite building material according to one preferred embodiment. In this illustration, the engineered composite building material is made in the form of a fiber cement cladding panel. As shown in FIG. 2, the process 200 to block 210 in which a fiber cement substrate is formed. The fiber cement substrate is preferably manufactured in accordance with known or available fiber cement compositions and manufacturing techniques. In one embodiment, the fiber cement composition may generally fall within the ranges set out in Table 1 below.

TABLE 1

Formulation of One or More Preferred Embodiments

| Dry ingredients (generic) | Dry ingredients of a preferred embodiment | Acceptable range (% by dry weight) | A preferred range (% by dry weight) |
|---|---|---|---|
| Binder | Cement | about 20–75% | about 25–50% |
| Aggregate | Silica | about 0 to 80% | about 30–65% |
| Fiber | Cellulose pulp | about 0.1 to 15% | about 7–10% |
| Additives | Alumina | about 0–5% | about 2.5–5% |

The binder may comprise ordinary Portland cement type I but may also comprise other inorganic binders such as gypsum, geopolymer, or other inorganic cements. The aggregate may comprise milled quartz, amorphous silica, perlite, vermiculite, synthetic calcium silicate hydrate, diatomaceous earth, rice hull ash, fly ash, bottom ash, blast furnace slag, granulated slag, steel slag, mineral oxides, mineral hydroxides, clays, magnasite or dolomite, polymeric beads, metal oxides and hydroxides, calcium carbonate, inorganic and organic microspheres, or mixtures thereof.

Preferred fibers include various forms of cellulose fibers, such as bleached or unbleached Kraft pulp. It will be appreciated, however, that other forms of fibers may be used. Other examples of suitable fibers are ceramic fiber, glass fiber, mineral wool, steel fiber, and synthetic polymer fibers such as polyamides, polyester, polypropylene, polymethylpentene, polyacrylonitrile, polyacrylamide, viscose, nylon, PVC, PVA, rayon, glass ceramic, carbon, or any mixtures thereof. The fibers may also include cellulose fibers with hydrophobic treatments, biocide treatments, or such as those disclosed in PCT Patent Applications WO 0228796 and WO 0228795, which are both hereby incorporated by reference in their entirety for all purposes.

It should also be noted that additional additives may be optionally incorporated into the fiber cement composition including but not limited to density modifiers, dispersing agents, silica fume, geothermal silica, fire retardant, viscosity modifiers, thickeners, pigments, colorants, dispersants, foaming agents, flocculating agents, water-proofing agents, organic density modifiers, aluminum powder, kaolin, alumina trihydrate, mica, metakaolin, calcium carbonate, wollastonite, polymeric resin emulsions, hydrophobic agents, or mixtures thereof.

In one preferred method, a fiber cement green sheet is produced using the Hatschek process. As it is generally known in the art, the Hatschek process uses a series of rotating drum sieves to deposit sequential layers of de-watered slurry onto an absorbent conveyer and accumulate them on a size roll until the desired sheet thickness has been achieved. However, it will be appreciated that the green sheets may also be produced using other suitable methods such as, for example, extrusion, casting, moulding, Mazza, Magnani, Fourdrinier and roll press processes.

At block 220 of the process 200, sub-surface regions comprising cement-polymer composite matrix may be formed in the fiber cement substrate by impregnating the substrate with one or more impregnating agents described herein. The impregnating agents may be applied while the fiber cement substrate is still in the green state or optionally applied to fully cured fiber cement. The impregnating agent may be applied using standard coating techniques such as spraying, roll coating, flooding, vacuum coating, and the like. Alternatively, the fiber cement substrate may be immersed in the impregnating agent for a predetermined amount of time. Preferably, the impregnating agent is a low viscosity isocyanate, silane, acrylics, and components with double bond or combinations thereof. The impregnation may be carried out under pressure or vacuum, cold or hot. The impregnation may also be implemented at a moisture enriched or moisture-free environment. The impregnating agent is formulated with a sufficiently low viscosity, preferably less than about 500 cps at 25° C., more preferably less than about 250, 200, 175, 150, 125, 100, 75, 50, 25, 10, 1 or 0.1 cps at 25° C., so as to enable the impregnating agent to penetrate the pores and interstices of the fiber cement matrix. Additionally, in certain embodiments, the impregnating agents may also be mixed in the fiber cement composition prior to forming the green sheet.

At block 230 of the process 200, the impregnating agent may form a durable mechanical and/or chemical bonds with one more components of the fiber cement substrate such as the cementitious matrix, the reinforcement fibers, the binder, or the aggregates. Preferably, the bonds are formed autogenously, without the need for added thermal or radiation energy. In certain implementations, the cement-polymer matrix in the sub-surface region may be cured at various pre-selected temperature and pressure conditions after the impregnating agent has been deposited in the pores and interstices of the fiber cement matrix. In one embodiment, the cement-polymer matrix may be cured at a temperature of less than about 100° C. and at a pressure of between about 10 atm-20 atm. In another embodiment, the cement-polymer matrix may be cured at a pressure of between about 50-200 millibars. In other embodiments, the cement-polymer matrix is cured at cryogenic temperature conditions or elevated temperature conditions.

At block 240 of the process 200, an optional coating, laminate or other protective material may be applied to at least one surface of the fiber cement substrate such that the coating or laminate may form a substantially continuous film upon the surface of the article. In certain preferred embodiments, the coating or laminate reacts with at least some of the impregnating agent in the sub-surface region to form a durable bond between the substrate and the impregnating agent, and between the impregnating agent and the coatings on the top. In some implementations, the coating, laminating, or other protective material is applied to the fiber cement article before the impregnating agent cures as described at block 230. The coating or laminate may then, in certain implementation, be cured using standard methods known or available in the art.

EXAMPLE 1

Effect on water absorption. Fiber cement specimens (10 mm×25 mm×25 mm) were made in accordance with the following formulation: about 35% by weight of Portland Cement, about 57% by weight of aggregate silica, and about 8% by weight of cellulose fibers and using methods described in U.S. Pat. No. 6,676,744 which is hereby incorporated by reference in its entirety for all purposes. The fiber cement specimens were dried in oven at a temperature of about 105° C. for 15 minutes. Each of the dried fiber cement specimens was weighed before impregnation. Each fiber cement specimen was subsequently immersed in an impregnating agent specified in Table 2 for 10 minutes at 72° F.+2° F. under atmospheric pressure. Paper towels were used to remove the excess impregnating agents from the surface of the specimens after impregnation. The impregnated fiber cement specimens were weighed. The impregnation loading was calculated based on the following formula:

$$\text{Impregnation loading} = \frac{\text{Weight after impregnation} - \text{Weight before impregnation}}{\text{Weight before impregnation}} \times 100. \quad (1)$$

TABLE 2

Impregnation Loading and Water Absorption of Impregnated Fiber Cement

| Impregnating agent | Viscosity, CPS | Molecular weight, g/mol | Impregnation loading in 10 min, % | 24 hrs water absorption of impregnated fiber cement, % |
|---|---|---|---|---|
| A  None | N/A | N/A | — | 36.9 |
| B  Prosil 9202 | 0.5–10 | 276.5 | 11.1 | 4.8 |

TABLE 2-continued

Impregnation Loading and Water Absorption of Impregnated Fiber Cement

| | Impregnating agent | Viscosity, CPS | Molecular weight, g/mol | Impregnation loading in 10 min, % | 24 hrs water absorption of impregnated fiber cement, % |
|---|---|---|---|---|---|
| C | SR 239 with initiator | 8–10 | 254 | 9.9 | 26.1 |
| D | 50% B + 50% C 239 | 1–10 | 254–276 | 10.3 | 15.2 |
| E | Rubinate 9433 | 16–20 | 265.3 | 11.5 | 1.42 |
| F | 50% B + 50% E | 1–18 | 265–276 | 12.3 | 1.77 |
| G | BS 2101 with 20% solid | 2–20 | 276–6,500 | 8.6 | 28.3 |
| H | Michem 71235 with 20% solid | 5–30 | 500–3,000 | 8.0 | 32.4 |
| I | Bayhydrol PR 240 with 20% solid | 5–30 | 2,000–1,000,000 | 5.4 | 31.6 |

Table 2 illustrates the impregnation loading of the fiber cement specimens loaded with different impregnating agents and the results of 24-hour water absorption tests of each impregnated fiber cement samples after curing. As shown in Table 2, the impregnating agents include Prosil 9202, which contains primarily octyltriethoxysilane and available from Clariant LSM of Jacksonville, Fla.; SR 239 which is a methacrylate monomer and available from Sartomer Company, Inc. of Exton, Pa. (3% of Benzoyl peroxide initiator was added to SR 239 as impregnating agent); Rubinate 9433 which is an isocyanate available from Huntsman Polyurethanes of Sterling Heights, Mich.; BS 2101 which is a silicone emulsion available from Wacker Chemical Corporation, Adrian, Mich.; Michem 71235 is a wax emulsion available from Michelman, Inc. of Cincinnati, Ohio; Bayhydrol PR 240 is polyurethane dispersion from Bayer Corporation. As also shown in Table 2, Rubinate 9433 and its combination with Prosil 9202 have a preferred water ingress resistant property.

EXAMPLE 2

Figure 3:
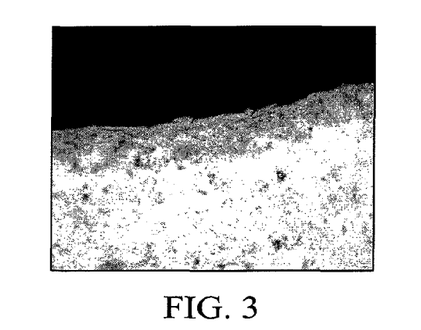
FIG. 3 is a cross section photograph of an impregnated fiber cement specimen made according to a preferred embodiment.

Paint adhesion after freeze thaw cycling. A fiber cement specimen prepared using the same materials and processes as in Example 1 was coated with Rubinate 9513 to achieve a wet film thickness of about 0.002 inches and allowed to penetrate into the surface for 10 minutes to form durable bonds within the pores of the fiber cement substrate. A penetration depth of about 150 to 350 microns was observed upon examining a cross section of the sample, as shown in the photograph of FIG. 3. Paint adhesion was tested and the sample was subjected to freeze thaw testing according to Japanese Industrial Standard JIS 1435-1991 and survived up to 320 freeze/thaw cycles without showing signs of paint peel failure as shown in Table 3 below:

TABLE 3

| Number of Freeze/thaw cycles | % Paint peel failure |
|---|---|
| 0 | 0 |
| 15 | 0 |
| 320 | 0 |

EXAMPLE 3

Figure 4:
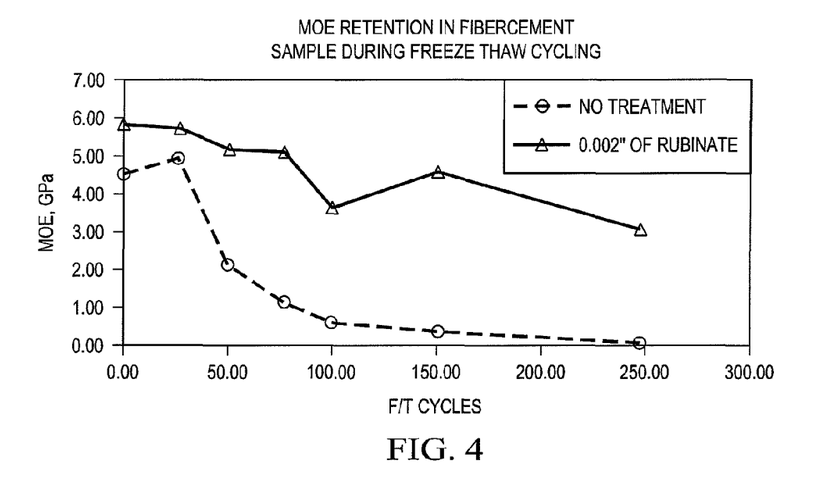
FIG. 4 is a chart comparing the MOE results after freeze-thaw cycling of an impregnated fiber cement specimen with the results of an equivalent fiber cement specimen without any impregnation.

Bending Stiffness Retention. A fiber cement specimen prepared using the same materials and processes as Example 1 was evaluated for modulus of elasticity (MOE) as a function of freeze/thaw cycles. As Illustrated in FIG. 4, the sample formed using a isocyanate impregnating agent retained at least 50% of its original bending stiffness modulus after 250 freeze thaw cycles while the untreated material lost more than 50% of its original bending stiffness after only 50 cycles.

EXAMPLE 4

Effects of impregnation time on water proof of impregnated fiber cement article. Table 4 shows the effects of impregnation duration and loading on water absorption of SR 239 impregnated fiber cement. About 3% of Benzoyl peroxide initiator was added to the impregnating agent SR 239. As shown in Table 4, with increased impregnation time, the water absorption of impregnated fiber cement was decreased substantially. The impregnation loading increases with the impregnation time.

TABLE 4

Effects of Impregnation Time on Water Absorption of SR 239 Impregnated Fiber Cement.

| Impregnation time | Impregnation loading (%) | 24 hrs water absorption of impregnated fiber cement (%) |
|---|---|---|
| 0 | 0 | 36.9 |
| 10 min | 9.9 | 26.1 |
| 30 min. | 16.2 | 19.2 |
| 4 hrs | 24.2 | 5.3 |
| 24 hrs | 30.3 | 1.7 |

EXAMPLE 5

Effect on paint adhesion. One face of a 5/16"×4"×5" (0.8× 10×12.7 cm) fiber cement plank (Selected Cedarmill texture with formulation I, James Hardie Building Products of Fontana, Calif.) with moisture content of about 18 to 20% was coated with about 0.0005" to 0.002" (0.013-0.05 mm) of Rubinate M which is available from Huntsman Polyurethanes of Sterling Heights, Mich. 0.01% of bismuth and zinc based catalyst such as Bicat 8 from Shepherd Chemical Company, OH, was mixed in Rubinate M. The plank was finished with two coats of paint (Monterey Grey, 15 gloss units, James Hardie Building Products of Fontana, Calif.) immediately after coating with Rubinate M. The first coat of paint was dried in a 60° C. oven for about 4 min. The dry thickness of the first coating was about 0.002" to 0.004" (0.05-0.1 mm). The second coat was dried in a 105° C. oven for about 2 min. The dry thickness of the second coating was about 0.001" to 0.003" (0.025-0.075 mm). Test peel adhesion of paint with 3M 250 masking tape was conducted after the finished fiber cement sample was cured in lab condition for 7 days.

Table 5 shows that the raw fiber cement (without any impregnating agent or undercoat) has 60-90% of paint peeled off by the tape when the specimen was saturated with water. But the same fiber cement impregnated with anywhere between about 0.0005" and 0.002" (0.013-0.05 mm) thick of Rubinate M did not show any paint peeling off by the tape. These results show that Rubinate M on the surface of fiber cement substantially affects bonding of the paint on the fiber cement article. Other isocyanates such as 0.002" (0.05 mm) of Rubinate 9513 and Rubinate 9433 also showed excellent adhesion.

TABLE 5

Peel Failure of Paint on Raw Fiber Cement Plank vs. Impregnated Fiber Cement Plank at Saturated Condition

| Impregnating Agent | Peel failure of saturated specimens (%) |
| --- | --- |
| None | 60 to 90 |
| 0.0005" (0.013 mm) of Rubinate M | 0 |
| 0.002" (0.05 mm) of Rubinate M | 0 |
| 0.002" (0.05 mm) of Rubinate 9513 | 0 |
| 0.002" (0.05 mm) of Rubinate 9433 | 0 |

EXAMPLE 6

Example 6 was prepared by applying impregnating agents to 5/16"×4"×5" (0.8×10×12.7 cm) fiber cement plank (Selected Cedarmill texture with formulation II, James Hardie Building Products of Fontana, Calif.). Table 6 illustrates that impregnating agent aliphatic isocyanate Desmondur XP 7100 (which is available from Bayer Corp.) also improves the adhesion between paint and fiber cement plank. 0.01% of bismuth and zinc based catalyst such as Bicat 8 from Shepherd Chemical Company, OH, was mixed in Desmondur XP 7100.

TABLE 6

Peel Failure of Paint - Raw Fiber Cement Plank vs. Impregnated Fiber Cement Plank at Equilibrium Condition

| Type of Impregnating Agent | Peel failure at equilibrium condition (%) |
| --- | --- |
| None | 40 |
| 0.0005" (0.013 mm) of Desmondur XP 7100 | 0 |
| 0.002" (0.05 mm) of Desmondur XP 7100 | 0 |

EXAMPLE 7

Improvement on mechanical properties. Six sides of a 5/16"×5"×7.5" (0.8×12.7×19 cm) fiber cement plank (Selected Cedarmill texture, James Hardie Building Products of Fontana, Calif.) with moisture content of about 18 to 20% were coated with an impregnating agent comprising about 0.0005" to 0.002" (0.013-0.05 mm) of Rubinate M. 0.01% of bismuth and zinc based catalyst such as Bicat 8 from Shepherd Chemical Company, OH was mixed in Rubinate M. After the Rubinate M was cured at ambient condition for 7 days, the specimens were immersed in water for 48 hrs. The planks were then tested for modules of elasticity (MOE). The results in Table 7 show that the thin layer of impregnating agent comprising Rubinate M on fiber cement slightly increased the stiffness of the fiber cement plank. The MOE values increase slightly with increased thickness of Rubinate M on fiber cement.

TABLE 7

Effects of Thickness of Impregnating Agent on Modulus of Elasticity (MOE) of Fiber Cement Article

| Wet film thickness of impregnating agent, inches (mm) | Modulus of elasticity (GPa) | Percent improvement |
| --- | --- | --- |
| 0 | 5.08 | — |
| 0.0005" (0.013) | 5.27 | 5% |
| 0.001" (0.025) | 5.93 | 17% |
| 0.002" (0.05) | 6.20 | 22% |

The engineered composite building material of the preferred embodiments provide certain improved physical and chemical properties as compared to an equivalent conventional composite building material without the engineered sub-surface regions. In one embodiment, a composite building material with the engineered sub-surface regions has improved moisture absorption characteristics. In a preferred implementation, the composite building material having an impregnation loading of about 100% provides about 15%, more preferably about 25%, reduction in moisture absorption as compared to an equivalent building material without the engineered sub-surface region. Additionally, the engineered composite building material also provides the material with improved adhesion to paint and other exterior coatings such that the peel failure is reduced from about 60%-90% failure rate to about 0% failure rate.

Although the foregoing description of the preferred embodiments has shown, described and pointed out certain novel features of the invention, it will be understood that various omissions, substitutions, and changes in the form of the detail as illustrated as well as the uses thereof, may be made by those skilled in the art, without departing from the scope of the invention. Particularly, it will be appreciated that the preferred embodiments may manifest itself in other shapes and configurations as appropriate for the end use of the article made thereby.

What is claimed is:

1. An engineered composite building material comprising:
a cementitious substrate having a pre-determined porosity; and
a sub-surface region formed in the substrate, said sub-surface region comprising a cement-polymer matrix configured to reduce moisture absorption of the building material, wherein the cement-polymer matrix comprises a polymeric impregnating agent chemically bonded to hydroxyl functional groups in the substrate, wherein the thickness of the sub-surface region is controlled by the viscosity of the impregnating agent and the porosity of the cementitious substrate, the impregnating agent having a viscosity of less than about 500 cps at 25° C., wherein the impregnating agent is deposited in the pores and interstices in the cementitious substrate of the sub-surface region, thereby causing the porosity of the sub-surface region to be less than the pre-determined porosity of the cementitious substrate.

2. The engineered composite material of claim 1, wherein the impregnating agent has a viscosity pre-selected to form the sub-surface region.

3. The engineered composite building material of claim 1, wherein the thickness of the sub-surface region is about 10 microns or greater.

4. The engineered composite building material of claim 1, wherein the thickness of the sub-surface region is about 100 microns or greater.

5. The engineered composite building material of claim 1, wherein the thickness of the sub-surface region is substantially the same as the thickness of the cementitious substrate.

6. The engineered composite building material of claim 1, wherein the polymeric impregnating agent is selected from the group consisting of isocyanates, epoxies, acrylics, and mixtures thereof.

7. The engineered composite building material of claim 6, wherein the impregnating agent comprises functional groups and wherein the functional groups are blocked.

8. The engineered composite building material of claim 6, wherein the impregnating agent is methylene diphenyl diisocyanate.

9. The engineered composite building material of claim 1, wherein the impregnating agent further comprises a polymerization initiator selected from the group consisting of organic peroxides, azo compounds, and mixtures thereof.

10. The engineered composite building material of claim 9, wherein the impregnating agent further comprises a catalyst selected from the group consisting of tertiary amines, metal salts, and combination thereof.

11. The engineered composite building material of claim 1, wherein the impregnating agent forms non-hydrolysable chemical bonds with free hydroxyl functional groups in the cementitious substrate.

12. The engineered composite building material of claim 1, wherein the cementitious substrate comprises a fiber cement matrix, said fiber cement matrix comprises fibers selected from the group consisting of cellulose fibers, PVA fibers, PP fibers, PE fibers, polyester fibers, carbon fibers, steel fibers, glass fibers and other mineral fibers, wherein the polymeric impregnating agent forms chemical and mechanical bonds with the fibers.

13. The engineered composite building material of claim 1, further comprising an exterior coating formed on an exterior surface of the building material, said exterior coating selected from the group consisting of paints, topcoats, primers, sealers, and combinations thereof.

14. The engineered composite building material of claim 13, wherein the impregnating in the sub-surface region forms a chemical bond with the exterior coating.

15. The engineered composite building material of claim 1, wherein the building material is selected from the group consisting of gypsum board, fiber cement board, fiber cement board reinforced by a mesh or continuous fibers, gypsum board reinforced by short fibers, mesh or continuous fibers, inorganic bonded wood and fiber composite material, geopolymer bonded wood and fiber board, concrete roofing tile, and one or more fiber-plastic composite material.

* * * * *